United States Patent [19]

Weaver et al.

[11] Patent Number: 5,168,747
[45] Date of Patent: Dec. 8, 1992

[54] SYSTEM AND METHOD FOR LOCATING LEAKS IN STEAM TURBINE SYSTEMS

[75] Inventors: Karen L. Weaver; Michael Twerdochlib, both of Oviedo, Fla.

[73] Assignee: Westinghouse Electric Corp., Pittsburgh, Pa.

[21] Appl. No.: 618,121

[22] Filed: Nov. 26, 1990

[51] Int. Cl.$^5$ .......................................... G01M 3/04
[52] U.S. Cl. .................................................. 73/40.7
[58] Field of Search .................................. 73/40.7, 40

[56] References Cited

U.S. PATENT DOCUMENTS

| | | | |
|---|---|---|---|
| 3,855,844 | 12/1974 | Craig | 73/40.7 |
| 3,975,943 | 8/1976 | Brachet | 73/40.7 |
| 4,226,113 | 10/1980 | Pelletier et al. | 73/40.7 |
| 4,510,792 | 4/1985 | Morel et al. | 73/40.7 |
| 4,524,607 | 6/1985 | Pelletier et al. | 73/40.7 |
| 4,840,058 | 6/1989 | Cohen | 73/40 |
| 4,898,021 | 2/1990 | Weaver et al. | 73/40.7 |
| 4,984,450 | 1/1991 | Bürger | 73/40.7 |

OTHER PUBLICATIONS

"On-Line Monitoring of Steam Turbine Air Inleakage" by Weaver & Twerdochlib et al. presented at the ASME/IEEE Power Generation Conference in Philadelphia, Pa. between Sep. 25 through the 29th, 1988.

Primary Examiner—Michael Razavi
Assistant Examiner—Raymond Y. Mah
Attorney, Agent, or Firm—G. H. Telfer

[57] ABSTRACT

Both a system and method are provided for detecting and locating a leak in the housing of the steam turbine components of an electric generator of the type that are connected to a vacuum pump that generates a negative pressure to remove air from the steam system, comprising a source of tracer gas for releasing a quantity of gas at potential leak locations on the exterior of the housings, a saturatable tracer gas detector having an inlet port in fluid communication with an outlet of the vacuum pump for detecting a flow of tracer gas associated with a selected minimum leak condition and for generating an electrical signal corresponding to this condition, an electrically controllable butterfly valve located upstream of the inlet port of the tracer gas detector for regulating the amount of tracer gas that flows into the detector, and a control assembly including a microprocessor that is electrically connected to both the tracer gas detector and to the valve for preventing a saturating flow of tracer gas from entering the inlet port of the detector. The system greatly expedites air inleakage inspections of such turbine systems since the tracer gas detector is prevented from becoming saturated with tracer gas, which in the prior art frequently caused the detector to become inoperative for significant periods of time.

10 Claims, 1 Drawing Sheet

SYSTEM AND METHOD FOR LOCATING LEAKS IN STEAM TURBINE SYSTEMS

BACKGROUND OF THE INVENTION

This invention generally relates to systems and methods of leak detection and is specifically concerned with a system and method for locating a leak in the steam turbine components of a turbine generator.

Systems for detecting air inleakage in the steam. turbine components of an electrical generator are known in the prior art. Such turbine components are designed to operate in an atmosphere consisting of steam and the purpose of such systems is to locate air leaks in the housings that contain these components so that ambient air may enter the housings that contain these components. Such leaks may occur from, for example, a misassembly of the steam turbine components after a maintenance operation, improperly left-on valves, or the breaking down of seals in the system from thermal differential expansion. The prompt detection of any such leakage sites is important if the various expensive components of the steam turbine system are to realize their full life span, as the unchecked ingress of the oxygen and carbon dioxide components in ambient air results in increased feedwater and economizer corrosion, boiler tube failure, reduced thermal efficiency, and corrosion fatigue and stress corrosion cracking of turbine components.

Because of the potential damage that can occur to the steam turbine components as a result of excessive air inleakage, many utilities employ continuous monitoring systems that are designed to inform the plant operators when a leakage condition occurs in the steam turbine system of the generator. Such monitoring systems generally operate by continuously monitoring the total output flow of the gases exiting the vacuum pump that continuously exhausts the steam from the steam turbine system. Any significant increase in this flow indicates that an inleakage condition has arisen. However, once such a leakage condition has generally been detected, the plant operator must then find the exact location of the leak before a suitable repair operation can be performed.

In one of the most common prior art leak detection systems, the system operator connects a tracer gas detector to the output of the vacuum pump of the steam turbine system, and then proceeds to spray a quantity of tracer gas, such as helium or freon, at potential leakage sites around the housings of the various components of the steam turbine system. The amount of gas sprayed is only roughly regulated by the operator, who merely counts to himself while pulling the trigger of a pistol-shaped nozzle. When the tracer gas is sprayed around the site of an air leak, some of the tracer gas is sucked into the interior of the steam turbine system, where it is ultimately directed into the inlet of the tracer gas detector via the outlet of the suction pump. When the tracer gas detector indicates that it has received a significant amount of tracer gas through its inlet, the system operator knows that he has released tracer gas around the site of a leak in the turbine system.

While the aforementioned prior art leakage detection system is capable of fulfilling its intended purpose, the applicants have noted several areas where such systems could stand improvement. For example, whenever tracer gas is released at the site of a major leak, it is not uncommon for the tracer gas detector to receive such a large volume of tracer gas that its sensors immediately become saturated. This is not an unusual occurrence as such devices are typically capable of detecting a flow of helium of as little as $10^{-10}$ liter-atm/sec, and further because it is necessary to adjust the gas detector to a fairly sensitive level so that any significant in-leakage condition may be detected. Unfortunately, once the tracer gas detector becomes saturated, it frequently takes several minutes for the excess helium to clear out of the detector before it can again become sensitive to a relatively small flow of helium. Such a saturation condition substantially protracts the amount of time necessary to completely inspect all of the potential leak locations on a steam turbine system, and may occur whenever helium is sprayed in the vicinity of a large leak, or whenever the technician inadvertently sprays too much helium around the location of a more moderate leak. The latter situation is made possible by the fact that the amount of tracer gas discharged by the tracer gas source is not precisely regulated, but rather is a subjective function of how long the system operator chooses to squeeze the trigger of the helium spray nozzle. The spraying of an imprecise amount of helium also makes it impossible for the system operator to make any but the roughest estimate of how large the detected leak might be.

Clearly, there is a need for an improved system for detecting the location of a leak in the steam turbine system of a generator which avoids the substantial delays associated with the prior art by preventing a saturating flow of helium from entering the tracer gas detector of the system. Ideally, such an improved system would be relatively simple and inexpensive, and broadly adaptable to detecting leaks in a variety of devices. Finally, it would be desirable if the improved system were capable of providing an accurate determination of the size of the leak detected.

SUMMARY OF THE INVENTION

Generally speaking, the invention is a system and method for locating a leak in the steam turbine components of a turbine generator of the type that are fluidly connected to a vacuum pump that generates a negative pressure within the housings containing the turbines and other components. The system comprises a source of tracer gas for releasing a measured quantity of the tracer gas at potential leak locations on the exterior of the housings, a saturable tracer gas detector having an inlet port in fluid communication with an outlet of the vacuum pump that generates a negative pressure within the turbine housings, an electrically controllable valve located upstream of the inlet port of the saturable gas detector for regulating the amount of tracer gas that flows into the detector, and a control assembly including a microprocessor having an input that is electrically connected to the tracer gas detector and an output that is electrically connected to the controllable valve for preventing a saturating flow of tracer gas from entering the inlet port of the detector.

The electrically controllable valve is preferably a butterfly valve having a throttle plate. A spring is provided for pivotally biasing the throttle plate into a closed position. The throttle plate is pivotally mounted on a shaft which in turn is connected to a stepper motor. An optical encoder assembly may be provided around the shaft of the stepper motor for generating a signal indicative of the angular position of the throttle plate.

The outputs of both the tracer gas detector and the optical encoder are electrically connected to the input of the microprocessor of the control assembly, while the output of this microprocessor is connected to a switch which regulates the amount of electrical power applied to the stepper motor. More specifically, this switch determines the number of pulses of electrical current which are applied to the input of the stepper motor, which in turn determines how many angular increments the shaft of the stepper motor turns the throttle plate of the butterfly valve.

The source of tracer gas preferably includes a mechanism for releasing a uniform volume of such gas every time it is actuated. To this end, the tracer gas source may include a bottle of pressurized tracer gas such a helium, a pressure regulator, an in-line standard flow impedance that is fluidly connected to the outlet of the pressure regulator for creating a fixed pressure drop across this output, and a solenoid-operated discharge valve for opening the outlet of the pressure regulator for a preselected amount of time every time the valve is actuated. The opening of the electrically-operated valve for a selected amount of time over a known standard pressure drop results in the discharge of a uniform volume of gas every time the valve is actuated. The magnitude of the leak detected by the discharge of such a uniform volume of tracer gas may then be computed by integrating the concentration of the tracer gas detected by the gas detector over time. The technique of integrating the detected concentration over time rather than merely noting the maximum concentration detected advantageously provide a true indication of the magnitude of the leak which is not dependent upon how far upstream the leak may be located in the steam system of the generator.

Finally, the system of the invention may include a flexible inlet conduit that is detachably connectable between the outlet of the vacuum pump of the steam system of the generator, and the inlet of the electrically controllable valve that is located upstream of the inlet port of the saturable tracer gas detector. A manually-operable valve may be provided between the inlet conduit and the inlet of the electrically controllable valve for regulating the flow of gas from the outlet of the vacuum pump to the inlet of the electrically controllable valve.

In the method of the invention, the inlet conduit of the system is first detachably connected to the outlet of the vacuum pump of the steam system of the generator. Next, the tracer gas detector of the system is calibrated by releasing a known volume of tracer gas from the tracer gas source and by observing the resulting reading generated by the tracer gas detector. The purpose of the calibration step is to make sure that the tracer gas detector will be sensitive enough to detect leaks of above a certain significant magnitude i.e., leaks of somewhere between 1 and 2 standard cubic feet per minute (scfm), but not so sensitive as to become saturated. This calibration step is performed by releasing a known volume of helium near an opening in one of the housings of the steam turbine system that is known to leak at approximately 1.8 scfm.

Finally, after the calibration step has been performed, the system operator conducts the leakage test by spraying helium tracer gas from the tracer gas source at all potential leakage sights on the housings of the steam turbine system with both the tracer gas detector and its protective electrically controllable valve in an actuated state. As soon as the tracer gas detector begins to receive a flow helium that might saturate it if unchecked, the stepper motor pivots the throttle plate of the butterfly valve so as to limit or stop the flow of helium-containing gas into the tracer gas detector.

The system of the invention greatly expedites air inleakage testing of the steam turbine system of a generator, and further results in a test that more accurately informs the system operator of the magnitude of the leaks detected.

BRIEF DESCRIPTION OF THE SEVERAL FIGURES

FIG. 1 is a schematic diagram of a steam turbine system, and how the general components of the leak detection system of the invention may be installed thereon, and FIG. 2 is a schematic diagram of the electronically controllable valve and the microprocessor that coacts to prevent a saturating flow of helium from entering the inlet port of the tracer gas detector of the system.

DETAILED DESCRIPTION OF THE PREFERRED EMBODIMENT

Figure 1:
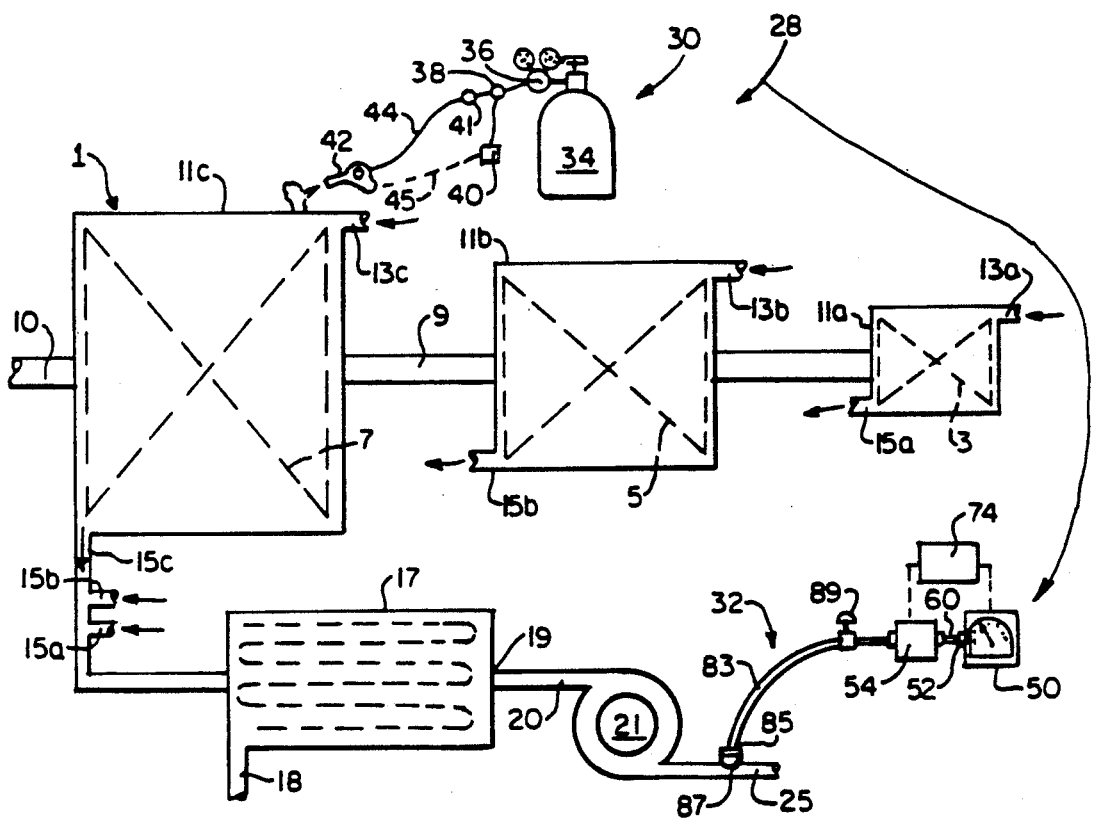
Figure 2:
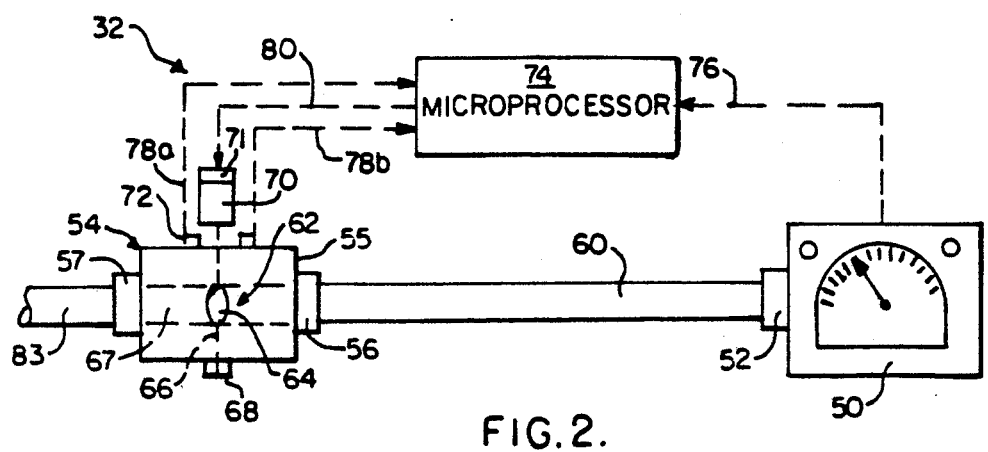

With reference now to FIG. 1, wherein like numerals designate like components throughout both FIGS. 1 and 2, the leak locating system of the invention is particularly adapted to detecting the location of leaks present in the steam turbine components 1 of an electric generator. Such components 1 typically include a high pressure turbine 3, a medium pressure turbine 5, and a low pressure turbine 7. Each of the turbines 3,5,7 turns a shaft 9 whose output end is connected to a power-generating alternator (not shown). Each of these turbines 3,5,7 is contained within a housing 11a,b,c, respectively. The housings 11a,b,c of each of the turbines 3,5,7 are provided with both a steam inlet 13a,b,c for receiving steam from a steam generator (which may be either nuclear or conventional), and a steam outlet 15a,b,c, that is connected to a condenser 17. The condenser 17 has a water outlet 18 for recirculating water formed from condensed steam back into the steam generator. The condenser 17 further includes a gas outlet 19 which in turn is connected to the inlet 20 of a vacuum pump 21. Pump 21 further includes an outlet 25 as shown. In operation, the purpose of the vacuum pump 21 is to continuously remove air from the condenser and turbines.

With reference now to FIGS. 1 and 2, the leak locating system 28 of the invention includes a tracer gas source 30, and a tracer gas detector assembly 32.

The tracer gas source 30 of the invention is advantageously capable of spraying a precise volume of a tracer gas, such a helium, whenever it is actuated. To this end, the tracer gas source 30 includes a bottle 34 of pressurized helium to which a pressure regulator 36 is connected. A solenoid operated valve 38 is fluidly connected to the output of the pressure regulator 36. This valve 38 is in turn connected to a gating or timing circuit 40 whose function is to open the solenoid operated valve 38 for a selected amount of time every time the circuit 40 is actuated, and then to close it again. Downstream of the valve 38 is a calibrated flow impedance 41 that is formed from an orifice plate of a kind which is known in the prior art, and commercially available. The outlet end of the fluid impedance 41 is in turn connected to a gas pistol 42 by means of gas line 44. A control cable 45 electrically connects the gas pistol 42 with the gating circuit 40.

In operation, when the system operator pulls the trigger of the gas pistol 42, the pistol 42 generates an electrical signal which actuates the gating circuit 40. The gating circuit 40 proceeds to open the solenoid operated valve 38 for a predetermined amount of time, and then to close it. A regulated flow of helium then proceeds through the calibrated orifice plate 41, where it is ultimately expelled out through the nozzle of the gas pistol 42. The precise volume of gas sprayed out of the end of the gas pistol 42 is controlled, of course, by the combination of the calibrated orifice plate in the pressure impedance 41, and the amount of time that the gating circuit 40 opens the solenoid operated valve 38. In the preferred embodiment, these components 40 and 41 are adjusted so that the gas pistol emits approximately 1 liter of helium every time its trigger is pulled.

Turning now to FIG. 2, the gas detector assembly 32 is provided with a tracer gas detector 50 which, in the preferred embodiment, is capable of detecting minute amounts of a helium tracer gas. In the preferred embodiment, the gas detector 50 is a model 938-41 "Portatest" manufactured by Varian located in Lexington, Mass. The gas detector 50 includes an inlet 52 for receiving a stream of gas as shown.

The gas detector assembly further includes an electrically controllable valve assembly 54 including a housing 55 having an outlet 56 on one side and an inlet 58 on the other side. A conduit 60 interconnects the outlet 56 of the valve assembly 54 to the inlet 52 of the gas detector 50. The valve assembly 54 further includes a butterfly valve 62 formed from a throttle plate 64 that is pivotally mounted on a shaft 66. The throttle plate 64 is disposed within an internal passageway 67 (indicated in phantom) disposed through the housing 55 of the valve assembly 54. A biasing spring 68 is mounted on the exterior of the housing 55 and is further connected onto the shaft 66 of the throttle plate 64 to bias the throttle plate 64 into a position which completely blocks the passageway 67 if no counter-torque is applied to the shaft 66. A stepper motor 70 whose output shaft is connected to the throttle plate shaft 66 is included within the valve assembly 54 for applying a counter-torque to the shaft 66 to overcome the force of the biasing spring 68 and hence to open (either completely or partially) the passageway 67. The stepper motor 70 may be any one of a number of prior art, commercially available motors whose output shafts are moved one angular increment every time the motor receives electrical power. A power relay or driver 71 is provided at the rear of the stepper motor 70 for selectively conducting pulses of power to the motor 71 from a power source (not shown). An optical encoder 72 is mounted around the output shaft of the stepper motor 70 in order to monitor the angular position of the throttle plate 64 within the passageway 67. Such optical encoders 72 are again commercially available items, and per se form no part of the instant invention.

The gas detector assembly 32 is further provided with a control assembly in the form of a microprocessor 74. In the preferred embodiment, the microprocessor 74 may be a model no. 87C461 manufactured by Intel, located in Santa Clara, Calif. The purpose of the microprocessor 74 is to coordinate the opening and the closing of the butterfly valve 62 of the valve assembly 54 with the amount of helium detected by the gas detector 50 so that the detector 50 never becomes saturated. To this end, an input cable 56 is provided between the gas detector 50 and the input of the microprocessor 74. Further, input cables 78a,b are provided between the optical encoder 72, and the input of the microprocessor 74. Finally, an output cable 80 links the output of the microprocessor 74 with the driver relay 71 associated with the stepper motor 70.

Finally, with respect to FIG. 1, the gas detector assembly 32 of the invention is provided with a detachably mountable conduit 83 having a quick release coupling 85 for detachably connecting the inlet 57 of the housing 55 of the butterfly valve 62 with a fitting 87 present on the outlet 25 of the vacuum pump 21. A manually operable needle valve 89 may be provided in the conduit 83 anywhere between the fitting 87 and the inlet 57 of the electrically controllable valve assembly 54.

In the method of the invention, the quick release coupling 85 is attached to the fitting 87 as shown in FIG. 1. Next, the gas detector 50 is empirically calibrated so that it is sufficiently sensitive to detect the presence of a leak of above a certain selected, significant magnitude, but not so sensitive so that its readings "max out" whenever it detects tracer gas from a very small leak, as small leaks are necessarily tolerated in such steam components 1. For these purposes, the sensitivity of the gas detector 50 is adjusted so that it is capable of detecting leaks on the order to 1 to 2 scfm. Such calibration is achieved by spraying helium from the tracer gas source 30 into a "known" leak on one of the housings 11a,b,c (which may be an orifice that is openable by means of a valve) while the suction pump 21 is operating. While such a calibration may be performed by repeatedly spraying helium from the tracer gas source 30 while adjusting the sensitivity of the gas detector 50, the manually-operable needle valve 89 may also be used for this purpose, as the opening or closing of the needle valve 89 determines the rate of flow of the gases entering the butterfly valve 62. The effect of the aforementioned calibration operation is to establish a zero base line for the readout of the gas detector 50.

In the next step of the method of the invention, the microprocessor 74 is programmed to close the butterfly valve 62 of the electrically controllable valve assembly 54 whenever the readout of the gas detector 50 begins to approach an amount capable of saturating the gas detector 50.

After the aforementioned programming of the microprocessor 74 has been achieved, the system operator commences his inspection of the steam turbine components 1 in order to determine, the location of any leaks that are present in the housings 11a,b,c, the condenser 17, or any other of the portions of the components 1.

Whenever the gas detector 50 detects a leak of a magnitude greater than the base line to which it is set, the fact that the tracer gas source 30 sprays a calibrated, uniform volume of helium gas with every pull of the trigger of the pistol 42 makes is possible for the system operator to determine the magnitude of the leak if he so desires. This may be accomplished by using the microprocessor 74 to generate a curve that indicates the level of detectable helium gas over time, and then to integrate the area under this curve. It has been noted that such a computation is not dependent upon the relative downstream location of the leak, but only to the magnitude of the leak.

I claim:

1. A system for detecting and locating a leak in housings of steam turbine components during operation of a turbine-generator installation, where said housings contain a steam atmosphere and are fluidly connected to a vacuum pump means for generating a negative pressure within said housings, characterized by:
   a source of tracer gas for releasing a quantity of said gas at potential leak locations on the exterior of said housings;
   a saturable tracer gas detector having an inlet port in fluid communication with an outlet of said vacuum pump for detecting a flow of said tracer gas, contained within said steam atmosphere, associated with a selected minimum leak condition and generating an electrical signal corresponding to said condition;
   an electrically controllable valve means located upstream of said inlet port for regulating the amount of tracer gas that flows into said detector; and
   a control assembly having a microprocessor having an input electrically connected to said detector and an output electrically connected to said valve means for preventing a saturating flow of tracer gas from entering the inlet port of the detector.

2. A system for detecting a leak as define in claim 1, wherein said electrically controllable valve means includes a butterfly valve having a throttle plate.

3. A system for detecting a leak as define in claim 2, wherein said electrically controllable valve means includes a biasing means for biasing said plate into a position that closes said valve means.

4. A system for detecting a leak as define in claim 3, wherein said electrically controllable valve means further includes a stepper motor means having an output shaft for varying the position of said throttle plate.

5. A system for detecting a leak as defined in claim 3, wherein said electrically controllable valve means includes an optical encoder assembly for generating a signal indicative of the position of the throttle plate.

6. A system for detecting a leak as defined in claim 1, wherein the source of tracer gas releases a quantity of helium.

7. A system for detecting a leak as defined in claim 1, wherein the source of tracer gas includes means for releasing a selected quantity of said gas.

8. A system for detecting a leak as defined in claim 1, further comprising an inlet conduit detachably connectable between the outlet of the vacuum pump means and the electrically controllable valve means for conducting tracer gas released by said source into the electrically controllable valve means.

9. A system for detecting a leak as defined in claim 8, further comprising a valve means for regulating the flow of gas conducted by said inlet conduit into said electrically controllable valve means.

10. A system for detecting and locating a leak in housings of steam turbine components during operation of a turbine-generator installation, where said housings contain a steam atmosphere and are fluidly connected to a vacuum pump means for generating a negative pressure within said housings, characterized by:
    a source of tracer gas for releasing a measured quantity of said gas at potential leak locations on the exterior of said housings;
    a saturatable tracer bas detector having an inlet port in fluid communication with an outlet of said vacuum pump means for detecting a flow of tracer gas, contained within said steam atmosphere, associated with a selected minimum leak condition and generating an electrical signal corresponding to said condition;
    an electrically controllable valve means located upstream of said inlet port for regulating the amount of tracer gas that flows into said detector, including a butterfly valve having a throttle plate, a stepper motor means for varying the position of said plate to open and close said valve means and an optical encoder means for generating an electrical signal indicative of the position of said throttle plate, and
    a control assembly including a microprocessor having an input receiving said electrical signal from said detector having an input electrically connected to said optical encoder means and an output electrically connected to said stepper motor means for regulating the position of said throttle plate to prevent a saturating flow of tracer gas from entering the inlet port of the detector.

* * * * *